United States Patent Office 3,718,435
Patented Feb. 27, 1973

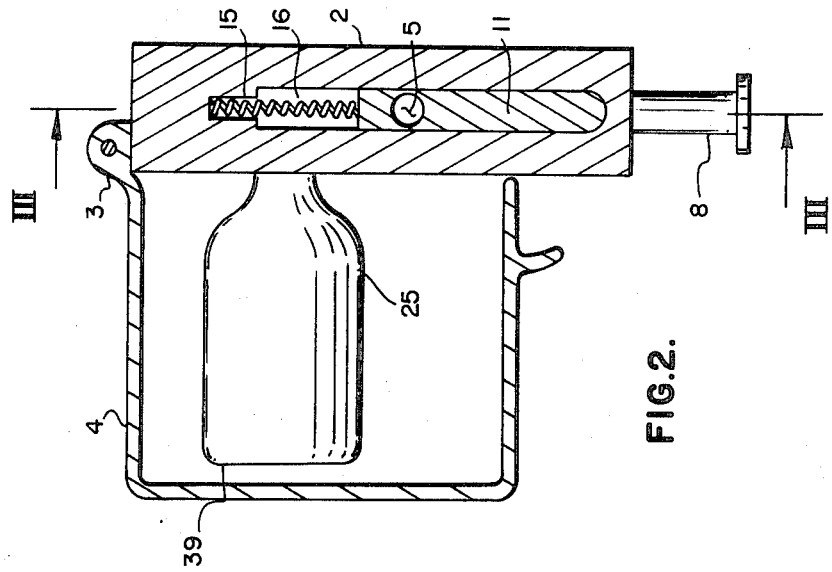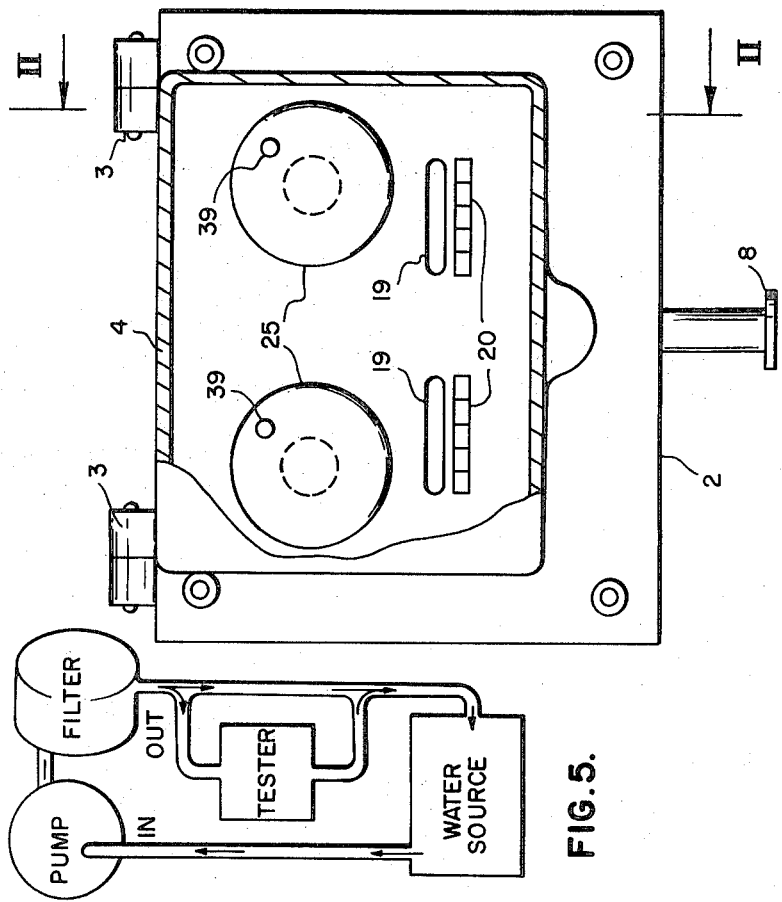

3,718,435
INSTANTANEOUS ON-LINE WATER TESTER
Ronald H. Tower, 3141 N. 37th St.,
Phoenix, Ariz. 85018
Filed Aug. 18, 1971, Ser. No. 172,787
Int. Cl. G01n 31/22, 33/18
U.S. Cl. 23—253 R                               11 Claims

ABSTRACT OF THE DISCLOSURE

An instantaneous on-line water tester for use in a water flow line comprising gate means for closing the water flow line at spaced apart locations to isolate a predetermined quantity of water therebetween, means for injecting a predetermined quantity of indicator material into the isolated quantity of water and means for viewing the isolated quantity of water with the predetermined quantity of indicator material injected thereinto. The gate means may comprise spaced apart gate elements operable to close the water flow line sequentially, first at a relatively downstream location and thereafter at a relatively upstream location. The tester includes an operating member and connections from the operating member operable sequentially upon operation of the operating member to first operate the gate means to isolate the predetermined quantity of water and thereafter inject the predetermined quantity of indicator material into the predetermined quantity of water. The gate means may close the water flow line at spaced apart locations to isolate two predetermined quantities of water, the injecting means injecting a predetermined quantity of indicator material into each isolated quantity of water. The injecting means may include pressure producing means for forcing indicator material into the isolated quantity of water, and pressure relief means may be provided for permitting escape of a quantity of water equal to the quantity of indicator material forced into the isolated quantity of water. The gate means may be in the form of a fork projecting through the water flow line, the fork operating the injecting means when the predetermined quantity of water has been isolated. The fork may have three prongs constituting gate elements to isolate two predetermined quantities of water, such gate elements being operable to close the water flow sequentially, first at the farthest downstream location, thereafter at the intermediate location and finally at the farthest upstream location, the injecting means injecting a predetermined quantity of indicator material into each isolated quantity of water.

---

To provide for a maximum health environment all enclosed water bodies utilized for swimming must be maintained within prescribed pH and free chlorine limits. Heretofore the pH and free chlorine levels have been determined by obtaining water samples of known volume in two vials, then adding to each vial a proportionate amount of indicator solution, an indicator solution for indicating pH level in one vial and an indicator solution for indicating free chlorine content in the other vial. The indicator solutions cause color changes based upon the pH level and free chlorine content of the original water samples. Such method of pH and free chlorine determination is time consuming, and results vary because it depends a great deal on operator skill in filling the vials to the prescribed levels and adding the proper amount of indicator solution. I have solved the problem by providing a device which I call an instantaneous on-line water tester which may, for example, be mounted in a by-pass line in the filter return line of a swimming pool or disposed in a line having an open end adapted to be immersed in a body of water as in a swimming pool with means for drawing water from said body of water through the line and through the indicator. It constitutes a manually actuated mechanical system that at any time is capable of entrapping accurately measured water samples and injecting into the samples premeasured amounts of indicator solution. Sight glasses are provided for viewing the color changes so that the pH level and free chlorine content of the water can be determined and adjusted accordingly. This device is not only fast but eliminates two possible sources of error by consistently obtaining the same sample size and injecting the proper amount of indicator solution every time.

I provide an instantaneous on-line water tester for use in a water flow line comprising gate means for closing the water flow line at spaced apart locations to isolate a predetermined quantity of water therebetween, means for injecting a predetermined quantity of indicator material into the isolated quantity of water and means for viewing the isolated quantity of water with the predetermined quantity of indicator material injected thereinto. The gate means may comprise spaced apart gate elements operable to close the water flow line sequentially, first at a relatively downstream location and thereafter at a relatively upstream location. The tester includes an operating member and connections from the operating member operable sequentially upon operation of the operating member to first operate the gate means to isolate the predetermined quantity of water and thereafter inject the predetermined quantity of indicator material ino tthe predetermined quantity of water.

The gate means may close the water flow line at spaced apart locations to isolate two predetermined quantities of water, the injecting means injecting a predetermined quantity of indicator material into each isolated quantity of water. The injecting means may include pressure producing means for forcing indicator material into the isolated quantity of water, and pressure relief means may be provided for permitting escape of a quantity of water equal to the quantity of indicator material forced into the isolated quantity of water.

The gate means may be in the form of a fork projecting through the water flow line, the fork operating the injecting means when the predetermined quantity of water has been isolated. The fork may have three prongs constituting gate elements to isolate two predetermined quantities of water, such gate elements being operable to close the water flow sequentially, first at the farthest downstream location, thereafter at the intermediate location and finally at the farthest upstream location, the injecting means injecting a predetermined quantity of indicator material into each isolated quantity of water.

I preferably operatively interpose lever means between the gate means and the injecting means for operating the injecting means to inject a predetermined quantity of indicator material into the isolated quantity of water by continued operation of the gate means after the gate means have isolated the predetermined quantity of water therebetween.

My instantaneous on-line water tester may be utilized in any situation in which water flowing in a conduit is to be tested. For example, the tester may be disposed in a by-pass line in the filter return line of a swimming pool, or it may be disposed in a line having an open end adapted to be immersed in a body of water as in a swimming pool, in which case means are provided for drawing water from the body of water through the line and through the tester.

Other details, objects and advantages of the invention will become apparent as the following description of a present preferred embodiment thereof proceeds.

In the accompanying drawings I have shown a present preferred embodiment of the invention in which FIG. 1 is a view partially in plan and partially in horizontal cross section of an instantaneous on-line water tester in accordance with my invention;

FIG. 2 is a vertical cross-sectional view taken on the line II—II of FIG. 1;

FIGS. 5 and 6 are diagrams showing systems in which my instantaneous on-line water tester may be employed.

Referring now more particularly to the drawings, there is provided a base 2 to which is hingedly connected at 3 a cover 4. The cover is closed when the tester is not in use and is opened when the tester is to be used. Extending through the base 2 is a passage 5 adapted to be connected with a water flow line so that water to be tested flowing in the line passes through the passage 5. The passage 5 is enlarged and internally threaded at its ends as shown at 6 to provide for connecting it into the water flow line.

Figure 3:
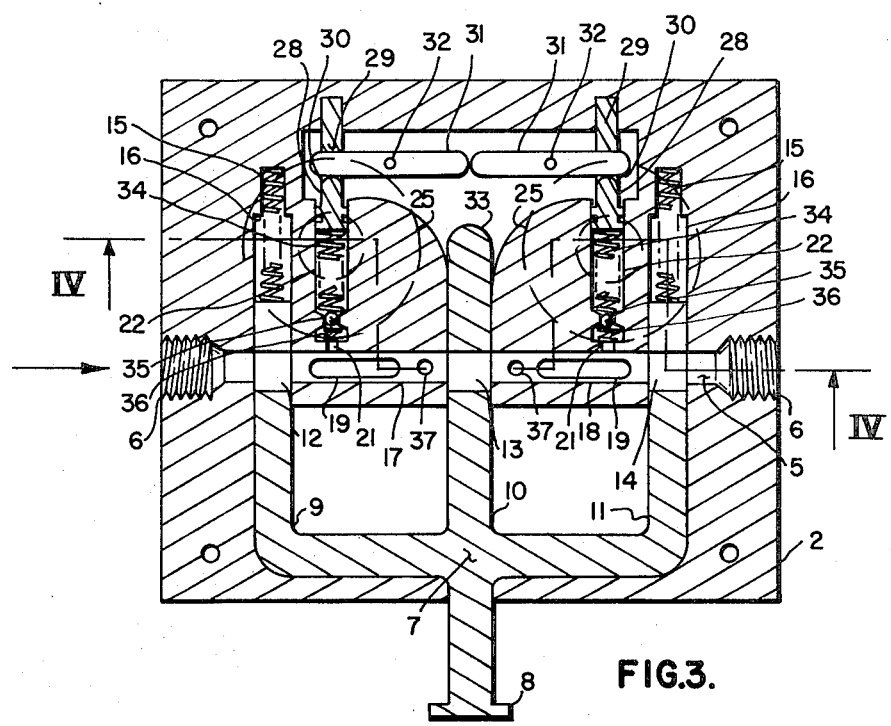
FIG. 3 is a horizontal cross-sectional view taken on the line III—III of FIG. 2.
Figure 4:
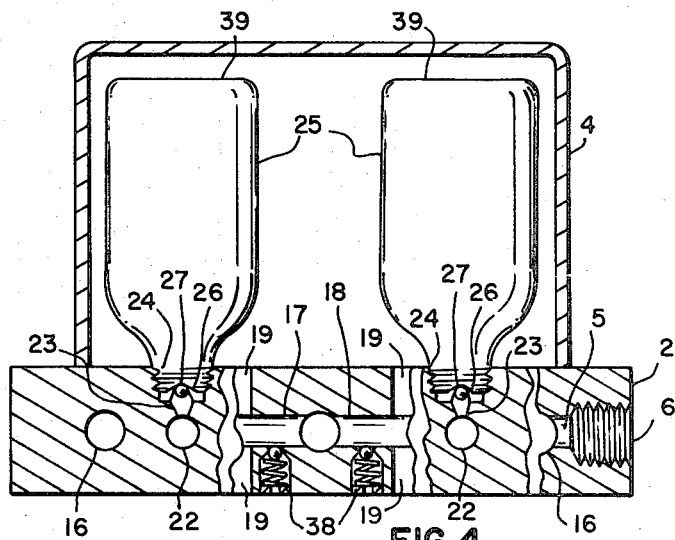
FIG. 4 is a vertical cross-sectional view with portions cut away taken on the line IV—IV of FIG. 3.

The base 2 is recessed to accommodate gate means in the form of a three-pronged fork 7 as clearly shown in FIG. 3. The fork 7 has a stem 8 projecting out of the base 2. The three prongs of the fork are designated respectively 9, 10 and 11. Each of the prongs 9, 10 and 11 intersects the passage 5. The prong 9 has extending transversely therethrough an opening 12, the prong 10 has extending transversely therethrough an opening 13 and the prong 11 has extending transversely therethrough an opening 14. The fork 7 is urged outwardly or toward the stem 8 by compression coil springs 15 disposed in bores 16 into which the inner ends of the prongs 9 and 11 extend. As shown in FIG. 3, the opening 12 is of maximum dismension longitudinally of the prong 9, the opening 13 is of intermediate dimension longitudinally of the prong 10 and the opening 14 is of minimum dimension longitudinally of the prong 11.

When the fork 7 is in its outermost position as shown in FIG. 3 water flows freely through the passage 5 and the openings 12, 13 and 14 which are in alignment with the passage 5. The direction of water flow is indicated by the arrow in FIG. 3, i.e., from left to right viewing that figure. When the fork 7 is pressed inwardly the openings 12, 13 and 14 are moved beyond the passage 5 so that the passage is closed by each of the prongs 9, 10 and 11. A predetermined quantity of water is isolated in a chamber 17 between the prongs 9 and 10 and a predetermined quantity of water is isolated in a chamber 18 between the prongs 10 and 11. Because of the difference in the longitudinal extent of the openings 12, 13 and 14 the farthest downstream prong 11 closes the passage 5 first and subsequently the intermediate prong 10 closes the passage 5 and finally the farthest upstream prong 9 closes the passage 5. Such sequential closing of the passage 5 at the three prongs insures that when the passage is closed by the three prongs predetermined quantities of water are isolated in the chambers 17 and 18; each of those chambers is completely filled with water.

Each of the chambers 17 and 18 is provided with a sight glass 19 through which the operator can observe the color of the water isolated in the chamber. A color comparator 20 may be mounted adjacent each of the sight glasses 19 as shown in FIG. 1.

Communicating with each of the chambers 17 and 18 through a passage 21 is a bore 22 leading into which is a well 23 the upper portion of which is enlarged and internally threaded at 24 to receive a bottle 25 having an externally threaded neck adapted to be threaded into the upper portion of the well. Each of the bottles 25 may be initially sealed at its mouth and a cutting element 26 may be provided to puncture the seal when the neck of the bottle is screwed into the well. One of the bottles contains indicator material for indicating the pH level of the water in the corresponding chamber 17 or 18 and the other bottle contains indicator material for indicating the free chlorine content of the water in the other chamber. The indicator material for indicating the pH level may, for example, be phenol red and the indicator material for indicating the free chlorine content may, for example, be ortho-tolidine (OTO). A check valve 27 is provided at the mouth of each of the bottles 25 to prevent retrograde movement of liquid through the mouth of the bottle, i.e., movement upwardly from the well 23 into the bottle.

Each of the bores 22 acts as a cylinder in which operates a piston 28 as shown in FIG. 3. Each of the pistons 28 has a stem 29 having an opening 30 therethrough into which projects an end of a lever 31 pivoted at 32. The levers 31 are adapted to be operated by the nose 33 of the central prong 10 of the fork 7 after the predetermined quantities of water have been isolated in the chambers 17 and 18. Inward movement of the fork 7 after the predetermined quantities of water have been isolated in the chambers 17 and 18 results in the nose 33 of the prong 10 turning the two levers 31 to force the pistons 28 inwardly or toward the bottom of FIG. 3. Inward movement of the pistons is resisted by compression coil springs 34. Check valves 35 prevent movement of water from the chambers 17 and 18 into the cylinders 22. The check valves 35 are pressed against their seats by compression coil springs 36.

Relief valves 37 urged against their seats by compression coil springs 38 are provided for the respective chambers 17 and 18 permitting escape of a quantity of water equal to the quantity of indicator material forced into the isolated quantity of water.

Any suitable provision may be made for venting the bottles 25. The bottles may be made of plastic material and may after being screwed into the wells 23 be punctured by a sharp instrument. A vent so formed in each of the bottles is designated 39.

In operation the instantaneous on-line water tester is disposed so that water to be tested flows through the passage 5 in the direction of the arrow in FIG. 3. The operator presses the fork 7 inwardly in a single stroke as far as it will go. As explained above the prongs 11, to 10 and 9 close the passage 5 sequentially in that order isolating a predetermined quantity of water in each of the chambers 17 and 18. Continued inward movement of the fork 7 injects predetermined quantities of the indicator materials into the respective chambers 17 and 18, and the operator by comparing through the respective sight glasses 19 the colors produced by the introduction of a predetermined quantity of indicator material into each predetermined quantity of water with the colors on the color comparator can determine the pH level and the free chlorine content of the water being tested.

When the fork 7 is withdrawn outwardly the chambers 17 and 18 are purged and the parts resume their original position with water flowing freely through the passage 5.

Figure 6:
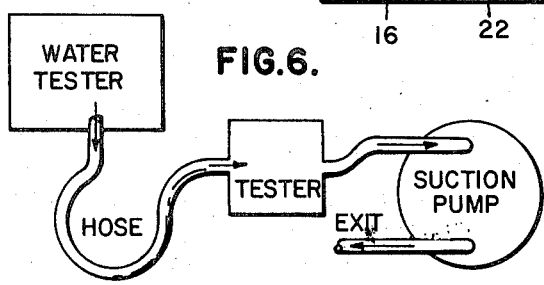

FIG. 5 shows my instantaneous on-line water tester disposed in a by-pass line in the filter return line of a swimming pool while FIG. 6 shows the tester disposed in a line having an open end adapted to be immersed in a body of water as in a swimming pool together with means indicated as a suction pump for drawing water from the body of water through the line and through the tester.

While I have shown and described a present preferred embodiment of the invention it is to be distinctly understood that the invention is not limited thereto but may be otherwise variously embodied within the scope of the following claims.

I claim:

1. An instantaneous on-line water tester for use in a water flow line comprising gate means for closing the water flow line at spaced apart locations to isolate a predetermined quantity of water therebetween, means for injecting a predetermined quantity of indicator material into the isolated quantity of water and means for viewing the isolated quantity of water with the predetermined quantity of indicator material injected thereinto.

2. An instantaneous on-line water tester for use in a water flow line as claimed in claim 1 in which the gate means comprise spaced apart gate elements operable to close the water flow line sequentially, first at a relatively downstream location and thereafter at a relatively upstream location.

3. An instantaneous on-line water tester for use in a water flow line as claimed in claim 1 including an operating member and connections from the operating member operable sequentially upon operation of the operating member to first operate the gate means to isolate the predetermined quantity of water and thereafter inject the predetermined quantity of indicator material into the predetermined quantity of water.

4. An instantaneous on-line water tester for use in a water flow line as claimed in claim 1 in which the gate means close the water flow line at spaced apart locations to isolate two predetermined quantities of water, the injecting means injecting a predetermined quantity of indicator material into each isolated quantity of water.

5. An instantaneous on-line water tester for use in a water flow line as claimed in claim 1 in which the injecting means include pressure producing means for forcing indicator material into the isolated quantity of water and pressure relief means are provided for permitting escape of a quantity of water equal to the quantity of indicator material forced into the isolated quantity of water.

6. An instantaneous on-line water tester for use in a water flow line as claimed in claim 1 in which the injecting means include pressure producing means for forcing indicator material into the isolated quantity of water and lever means are operatively interposed between the gate means and the injecting means for operating the injecting means to inject a predetermined quantity of indicator material into the isolated quantity of water by continued operation of the gate means after the gate means have isolated the predetermined quantity of water therebetween.

7. An instantaneous on-line water tester for use in a water flow line as claimed in claim 1 in which the gate means are in the form of a fork having three prongs constituting gate elements projecting through the water flow line to isolate two predetermined quantities of water and the injecting means include pressure producing means for forcing indicator material into the isolated quantities of water, toegther with levers operatively interposed between the central fork of the gate means and the injecting means for operating the injecting means to inject predeterimned quantities of indicator material into the isolated quantities of water by continued operation of the gate means after the gate means have isolated the predetermined quantities of water.

8. An instantaneous on-line water tester for use in a water flow line as claimed in claim 1 in which the tester is disposed in a by-pass line in the filter return line of a swimming pool.

9. An instantaneous on line water tester for use in a water flow line as claimed in claim 1 in which the tester is disposed in a line having an open end adapted to be immersed in a body of water as in a swimming pool and means are provided for drawing water from said body of water through said line and through the tester.

10. An instantaneous on-line water tester for use in a water flow line as claimed in claim 1 in which the gate means are in the form of a fork projecting through the water flow line, the fork operating the injecting means when the predetermined quantity of water has been isolated.

11. An instantaneous on-line water tester for use in a water flow line as claimed in claim 10 in which the fork has three prongs constituting gate elements to isolate two predetermined quantities of water, such gate elements being operable to close the water flow sequentially, first at the farthest downstream location, thereafter at the intermediate location and finally at the farthest upstream location, the injecting means injecting a predetermined quantity of indicator material into each isolated quantity of water.

References Cited

UNITED STATES PATENTS 2,977,199  3/1961  Quittner _____ 23—253 R X
3,607,082  9/1971  Thiers _____ 23—253 R X JOSEPH SCOVRONEK, Primary Examiner R. M. REESE, Assistant Examiner